Figure 1:
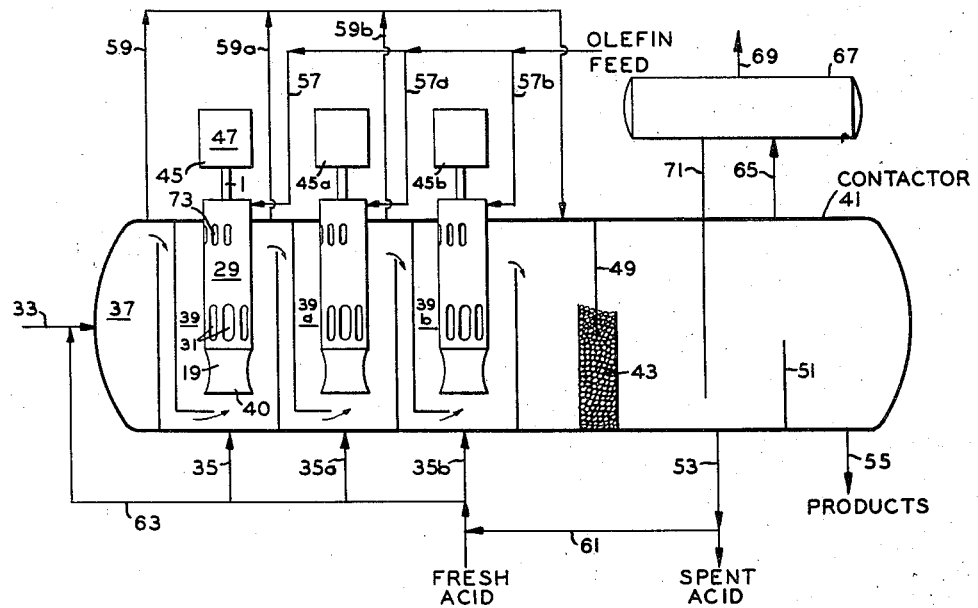

Sept. 16, 1958  S. R. STILES  2,852,581
PROCESS AND APPARATUS FOR ALKYLATION OF HYDROCARBONS
Filed May 31, 1955

INVENTOR.
SAMUEL R. STILES
BY
ATTORNEYS

United States Patent Office 2,852,581
Patented Sept. 16, 1958

2,852,581

PROCESS AND APPARATUS FOR ALKYLATION OF HYDROCARBONS

Samuel R. Stiles, Cresskill, N. J., assignor to The M. W. Kellogg Company, Jersey City, N. J., a corporation of Delaware Application May 31, 1955, Serial No. 511,989

6 Claims. (Cl. 260—683.43)

This invention relates to an alkylation process and more particularly to method and apparatus for the alkylation of hydrocarbons in the presence of a liquid catalyst. Still more particularly, the invention relates to method and means for minimizing catalyst entrainment and carryover from an alkylation reaction zone.

The alkylation reaction, namely the reaction of a hydrocarbon with an olefin in the presence of a liquid catalyst takes place in a heterogeneous system in which the hydrocarbon is substantially insoluble in the catalyst, whereas the olefin is almost completely soluble therein. When these materials are brought together in a reaction zone, the catalyst and olefin form one liquid phase and the hydrocarbon another. A typical example is the alkylation of an isoparaffin, for instance isobutane, with an olefin, such as butylene, in the presence of sulfuric acid. Presumably this reaction takes place at the interface between the phases, substantially as illustrated by the following reactions.

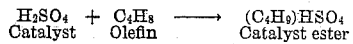
$$H_2SO_4 + C_4H_8 \longrightarrow (C_4H_9)HSO_4$$
Catalyst  Olefin  Catalyst ester

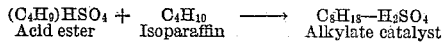
$$(C_4H_9)HSO_4 + C_4H_{10} \longrightarrow C_8H_{18}\text{—}H_2SO_4$$
Acid ester  Isoparaffin  Alkylate catalyst Unfortunately, the usual alkylation catalyst is also highly effective in promoting polymerization reactions. The olefin being in the same phase with the catalyst is thus highly susceptible to being polymerized as illustrated by the following reaction.

$$(C_4H_9)HSO_4 + C_4H_8 \longrightarrow (C_4H_8)x + H_2SO_4$$
Acid ester  Olefin  Polymer  Catalyst Polymers similar to that shown have low octane numbers and are subject to decomposition at higher temperatures. Because of this they are undesirable both in the alkylate recovery system and as a component of the alkylate product. In addition, since two or more olefin molecules are consumed for each molecule of polymer formed in contrast to the requirement for only one molecule of olefin per molecule of alkylate, the polymerization reactions result in an excessive consumption of olefin.

In addition to the preceding reactions, mono esters of the alkylation catalyst may also react with olefins to form more complex esters as shown.

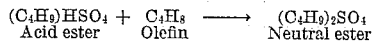
$$(C_4H_9)HSO_4 + C_4H_8 \longrightarrow (C_4H_9)_2SO_4$$
Acid ester  Olefin  Neutral ester These materials are also undesirable in the alkylate product for the same reasons as the olefin polymers, namely low quality, decomposition tendency and excessive olefin consumption.

The failure of acid esters as illustrated to react to form alkylate and the formation instead of olefin polymers and neutral esters results from the fact that the acid ester molecules do not contact isoparaffin molecules. Another factor which influences the production of these undesirable side products is the high reactivity of olefins in the presence of the alkylation catalyst, in this instance sulfuric acid, particularly at high temperatures. A partial control of the production of polymers and esters, both those illustrated and others of more complex molecular structure and higher molecular weight, is provided by carrying out the alkylation reaction in such a manner that a large excess of alkylatable hydrocarbon is always present in the reaction zone. In addition, reaction conditions of temperature, pressure, acid concentration, etc., when closely controlled also tend to promote the alkylation reaction and diminish side reactions.

In one of the preferred methods of conducting the alkylation reaction, the alkylatable hydrocarbon and liquid catalyst are introduced into a reaction zone, emulsified, and the olefin reactant is injected into the emulsion. This is customarily carried out in a vertical mixer or pump with the introduction of the olefin taking place internally of the pump and at a point subsequent to the formation of the isoparaffin catalyst emulsion. The reaction mixture is usually retained within the pump for a short period of time during which a substantial part of the reaction takes place and is then released through the pump shell. The pumps or mixers are usually over sized to provide recirculation of unconsumed alkylatable hydrocarbon and alkylation catalyst thereby providing a high concentration of these materials at the point of reaction. A net product stream sufficient to provide a material balance is withdrawn from the reaction zone for recovery and purification.

The alkylation reaction is usually highly exothermic in nature, with the result that large quantities of heat are given off in the alkylation zone and particularly in the mixer. A substantial portion of this heat is consumed in the vaporization of a portion of the alkylation reactants. To provide release of the vapors, which are formed primarily in the mixer, it has been customary to install vapor vents in the upper portion of the mixer above the liquid level in the alkylation zone. While this presents a very effective means of removing vapors, it has introduced a serious operating problem. The quantity of vapors released during the alkylation reaction is so great that a high degree of turbulence is created within the mixer and the vapors leaving the mixer contain a considerable quantity of entrained liquid emulsion. This has had several detrimental effects: (1) It has resulted in the removal of emulsion from the reaction zone in the effluent vapors and in the introduction of corrosive catalyst and esters into the refrigeration system: (2) It has caused excessive back pressure on the reactor vapor vent lines often with the result that vapor is forced to flow into subsequent reaction sections thereby vapor locking the emulsion circulation pump and reducing alkylation contacting efficiency in this zone, and (3) It has resulted in increased catalyst carry over to succeeding reaction sections thus substantially increasing the required catalyst circulation rate.

It is on object of this invention to provide improved process and apparatus for the alkylation of the hydrocarbons in the presence of a liquid catalyst.

It is another object of this invention to minimize liquid entrainment from an alkylation reaction zone in process and apparatus for the alkylation of hydrocarbons in the presence of a liquid catalyst.

Still another object of the invention is to reduce the consumption of olefins and the formation of undesirable side products in process and apparatus for the alkylation of hydrocarbons in the presence of a liquid catalyst.

Yet another object of this invention is to reduce catalyst circulation in a process for the alkylation of hydrocarbons in the presence of a liquid catalyst.

Still another object of this invention is to increase the yield of alkylate produced in the alkylation of an isoparaffin with an olefin in the presence of sulfuric acid.

These and other objects of the invention will become more apparent from the following detailed description and discussion.

In carrying out this invention the aforementioned objects are achieved by venting vapors which are formed in the alkylation mixer into a portion of the alkylation reaction zone remote from the region of passage of vapors and liquid from said zone. In a more specific aspect, these objects are obtained by providing vapor vents in the upper portion of said alkylation mixer, opening on the upstream side of the alkylation reaction zone, vapor and liquid being withdrawn from the alkylation reaction zone on the downstream side thereof.

The present invention is applicable to alkylation reactions generally, such as the reaction of an olefin with an alkylatable compound for example an aliphatic hydrocarbon, an aromatic compound, a cycloaliphatic compound, etc. A well known process for which this invention is suitable and one which is applied widely on a commercial scale involves the reaction of an isoparaffin with an olefin to form a high octane mixture boiling in the gasoline range. In carrying out this reaction, it is customary to utilize feed stocks of varying composition containing a variety of saturated and unsaturated compounds. A primary source of feed materials for this reaction exists in refinery process gases which may contain paraffins having from 1 to 6 carbon atoms, isoparaffins, including isobutane, isopentane, isohexane and higher molecular weight compounds and numerous low boiling olefins and their isomers, for example propylene, butylene, isobutylene, etc. It is within the scope of this invention to use feed stocks containing these and higher boiling compounds in widely varying proportions.

A wide variety of catalysts are available for use in the alkylation of an alkylatable compound with an olefin or more specifically an isoparaffin with an olefin. Those frequently employed include acids such as sulfuric, hydrofluoric, phosphoric, chlorosulfonic, fluorosulfonic, etc., which may be used either singly or in mixtures. Non-solid Friedel-Crafts catalysts which form a liquid phase substantially immiscible with the hydrocarbon phase may be used. They include the conventional Friedel-Crafts metallic halides in acids such as those just enumerated and metallic halide-hydrocarbon complexes. Other liquid catalysts which provide a heterogeneous reaction mixture with hydrocarbons may also be used within the scope of this invention.

While the various kinds of catalysts can be used, the invention is especially adapted to the sulfuric acid alkylation. The alkylation of isoparaffins with olefins in the presence of sulfuric acid is preferably conducted at temperatures betwen about 0° F. and about 150° F. The pressure in the reaction zone is maintained at a level sufficient to keep the reactants in a liquid state usually between about atmospheric and about 100 p. s. i. g. In order to obtain a high quality product, it is desirable to maintain a high isoparaffin to olefin ratio in the feed to the reaction zone, preferably between about 2 and about 20 mols per mol and it is necessary to keep the acid catalyst strength above about 80 percent and preferably above about 90 percent. A preferred method of providing the desired reactant ratio is to conduct the process in several reaction stages with series flow of the isoparaffin and catalyst through each stage and parallel flow of olefin to each stage. The time required to carry out the alkylation reaction varies with the operation conditions; however, in general, a reaction time between about 2 minutes and about 200 minutes suffices. The alkylation process is preferably conducted in the liquid phase and under conditions of agitation whereby good contact is obtained between the hydrocarbon reactants and the alkylation catalyst.

The alkylation of an aromatic or a cycloaliphatic compound with an olefinic compound results in the production of compounds which may be useful in themselves, but which generally are more useful as intermediates in the manufacture of other chemical compounds. Examples of aromatic and cycloaliphatic alkylation reactions include the reaction of benzenes, naphthalenes, phenols, etc., and their homologues with olefins in the presence of mixed catalysts, for example hydrofluoric acid-boron trifluoride or liquid complexes of aluminum chloride with acids and/or hydrocarbons. In general, these reactions are carried out between about 30 and about 120° F. under atmospheric or super atmospheric pressures, as required to maintain the reactants in a liquid state. Other typical reactions are benzene with propylene in the presence of liquid phosphoric acid, benzenes with isoparaffins in the presence of olefins and an acid such as sulfuric or hydrofluoric, isoparaffins with alkyl substituted cyclopentanes in the presence of an acid such as sulfuric or hydrofluoric, etc. The reaction conditions used in these and similar reactions involve temperatures and pressures comparable to those illustrated. Normally the alkylatable compound is present in greater quantity than the olefinic reactant, and the relative concentrations of catalyst and hydrocarbon reactants in general conform to those required for the alkylation of isoparaffins. The pressures may vary from subatmospheric to several atmospheres depending on the particular reactants; and the reaction time required varies from as low as a few minutes to several hours.

The olefinic reactants used in alkylating acyclic, cycloaliphatic and aromatic compounds are usually the low boiling olefins previously mentioned; however, other more complex olefinic compounds well known to those in the art which are capable of entering into the alkylation reactions are also included within the scope of this invention.

In a typical application of this invention isobutane and sulfuric acid are introduced into an alkylation reaction zone and are violently agitated to form an emulsion, this being the preferred method of assuring intimate contact between the acid catalyst and the hydrocarbon to be alkylated. The major portion of the isobutane feed is provided by a recycle stream obtained from subsequent distillation steps. Any additional quantity of isobutane required, for example, that amount needed to start up the unit is usually supplied from an independent source. The mixing and agitation required in the contact zone may be provided in a number of ways; however, usually a conventional mixer or pump provides a means for creating and moving the emulsion at high velocity and also for circulating the emulsion in the contact zone. The reaction may be carried out in one stage, although more usually several stages in series are provided with a portion of the olefin reactant being admitted to each stage and contacting isobutane passing serially through the successive stages. The alkylation feed, which contains the olefin reactant, also contains isobutane, butane, propane, isopentane, pentane, and frequently small quantities of lighter paraffins. The temperature in the reaction zone is maintained at a constant low level by vaporizing therefrom the lighter components in the reaction products, more usually, a mixture of butane, isobutane, propane and any lower boiling compounds. The vapors are compressed and condensed and the condensate, after the removal of propane and lighter components, is returned to the alkylation reaction zone in the isobutane recycle.

Effluent from the last contactor reaction section is passed to a separation zone wherein contaminated acid containing some polymers and acid esters is separated from the hydrocarbons. A portion of the contaminated acid containing active catalyst is recycled to the contactor and the remainder is either processed to remove contaminates and reused or is used in a treating process wherein a high degree of acid purity is not required or is discarded. Generally, the recycled contaminated acid is combined with fresh acid before being admitted to the contactor.

The material remaining after separation of the acid comprises a mixture of alkylate, unconverted isobutane, low boiling paraffins, butylene polymers and acid and neutral esters. This mixture is removed from the alkylation contactor, caustic washed to remove entrained acid, and passed through a series of distillation steps for the separation of low boiling components, primarily isobutane and normal butane (not shown).

In the method of this invention, the olefin reactant is introduced into the flowing acid-isoparaffin emulsion within the mixing pump, more usually downstream of the emulsion. The various alkylation reactions occur almost immediately and proceed as the emulsion passes upward through the mixer. It is desirable to retain the reactants in the mixer until at least a substantial portion of the olefin reactant is consumed. One means of accomplishing this is to pass the emulsion upward within the mixer through conduits which are open at the top to allow overflow of liquid into a pool of liquid contained within an enclosing mixer shell. The liquid is allowed to pass from the shell through ports in the lower portion thereof and re-enter the alkylation reactor. The purpose of retaining the reactants within the mixer shell as described is to allow the alkylation reaction to proceed in an atmosphere of maximum acid and isoparaffin concentration.

A large amount of heat is released during the alkylation reaction and is taken up by the flowing emulsion primarily by vaporization of a portion of the hydrocarbons contained therein. As a result, the volume of the material flowing through the mixer sharply increases and a highly turbulent mixture of liquid and vapor emerges from the aforementioned upflowing conduits and passes at high velocity into the upper interior of the mixer shell. Due to space limitations within the mixer, only a very short settling time is allowed for separation of liquid from the mixture and as a result a quantity of emulsion in the form of droplets many of which are relatively large in size fails to disengage from the vapor and passes through openings in the mixer shell into the vapor space of the alkylation reaction zone. It has been found in previous operations that a portion of the entrained emulsion is carried from the reaction zone into the vapor recovery system wherein acid contained therein causes corrosion. In addition, as stated previously the amount of entrained liquid has at times become so great as to restrict the flow of vapor from the reaction zone and force it to flow instead through the liquid outlet from said zone. In the method of this invention, the vapor openings in the mixer shell rather than being located around the entire periphery of the shell as in the past are arranged to open into a region of the reaction zone which is remote from the conduit through which vapors are vented from this zone. More usually, the vapor outlet conduit is located in the downstream portion of the reaction zone and the mixer-vapor vents are on the upstream side of the mixer. Preferably these vents are located in as small a radial portion of the shell as possible; however, any location lying substantially within the upstream half of the mixer is within the scope of the invention. By virtue of the location of the mixer-vapor vents as described, the average length or path of travel of vapor through the reaction zone is increased thus providing for increased settling of emulsion and decreased acid-catalyst entrainment into the alkylation vapor recovery system. The beneficial results of this method of operation are apparent from the preceding discussion concerning the disadvantages which result from emulsion entrainment.

It has been stated previously that the alkylation reaction is more usually carried out in a series of steps or stages with a portion of the olefin reactant being admitted to each stage and contacting isoparaffin passing serially through the successive stages. The desirability of a high concentration of acid catalyst and isoparaffin at the point of reaction has also been emphasized. One conventional method of maintaining a high acid concentration in a system containing several reaction stages is to overflow liquid from the top of each stage into the bottom of the succeeding stage. The acid emulsion is not stable and tends to separate into acid and isoparaffin layers. Because of this, considerable stratification takes place in each reaction stage whereby the material in the top portion thereof becomes rich in isoparaffin and the bottom liquid becomes increasingly concentrated in acid. Thus, the highest concentration of acid is present at the entrance to the mixer, as preferred, and the material overflowing each reaction stage has a low acid content, also as preferred. It is apparent that when operating in this manner it should be possible to carry out the alkylation reaction with a low circulation of acid through the various reaction stages. Unfortunately, with the mixer venting arrangement used in the past, acid circulation rates have not been as low as expected. Apparently in the conventional alkylation reactor, a portion of the emulsion entrained in the vapors leaving the mixer vents settles from the reaction zone vapor space on to the liquid below. With a relatively high rate of liquid flow through the reaction stage, emulsion deposition near the liquid overflow does not have sufficient time to separate into two phases and is carried into the next reaction stage. The effect of this, of course, is to increase acid circulation. It has been found that the method proposed herein for relocating mixer vapor vents so as to introduce vapor into the region of the reaction stage remote from the point of liquid withdrawal eliminates this problem and provides a much more efficient operation.

Figure 2:
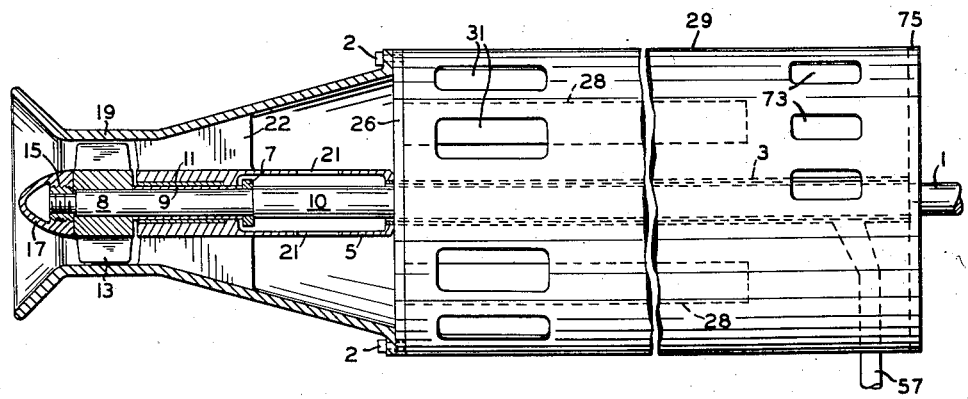

In order to more clearly describe the invention and provide a better understanding thereof, reference is had to the accompanying drawings of which:

Figure 1 is a diagrammatic illustration of an alkylation contactor drawn in cross section and Figure 2 is a partial view of a mixing pump shown in Figure 1, also in cross section.

Referring to the drawings, the alkylation reactions are carried out in a cylindrical elongated closed contacting vessel 41. The interior of approximately ⅔ of the contactor is divided into a number of separate reaction stages or sections 39, 39a and 39b by transverse baffles so arranged that liquid entering the end of the contactor passes from an inlet chamber 17 upward over a baffle down to the bottom of the first reaction section 39, upward through section 39 over a second baffle down to the bottom of the second section 39a and in a similar manner through the third section 39b. Each section contains a mixer 45, 45a and 45b respectively, in this specific illustration propeller type submersible pumps disposed vertically with the drivers located outside and above the contactor 41 and the propellers located in the lower portion of each reaction section. Each pump is so constructed that material entering the suction thereof is forced upward within the pump casing or shell and then downward and out through openings in the casing into the corresponding reaction section. The pump capacities are such that the quantity of material circulated through each pump is several times greater than the total liquid flow entering the section in which the pump is located.

The alkylation reactants and catalyst enter the contactor 41 at three different points. The alkylation feed comprising a mixture of propane, butane, isobutane, and butylene is split into three streams which enter in mixing pumps 45, 45a and 45b through conduits 57, 57a, 57b respectively. This material passes downward within each pump through a hollow sleeve surrounding the pump shaft and is admitted to the liquid stream flowing through pump downstream of the pump impellers. A mixture of butane and isobutane is admitted to the inlet chamber 37 of the contactor through conduit 33 and the acid catalyst comprising fresh acid or a mixture of fresh acid and contaminated acid is admitted to the bottom of the first reaction section 39 through conduit 35. As illustrated, acid may also be introduced into the succeeding sections 39a and 39b through conduits 35a and 35b; also acid may be combined with the isobutane recycle through conduit 63 prior to the admission of this stream to the contactor.

The hydrocarbon passes from the inlet chamber 37 into the first section 39, is combined with the acid and the mixture enters the suction 40 of pump 45 where it is picked up, emulsified and directed upward at a high velocity. The alkylation feed from conduit 57 is admitted to the emulsion downstream of the pump propellor 13 and the alkylation reaction proceeds immediately and is substantially completed before the reactants leave the pump casing 29 through openings 31. As mentioned before, the capacity of pump 45 and the other pumps is sufficiently great to assure a circulation rate several times as large as the flow of olefin feed, isobutane and acid into section 39. Thus, unreacted isobutane is circulated along with the acid catalyst and a portion of the alkylation product, through the pump a number of times before it passes into the next section where another portion is reacted with fresh olefin feed. The same procedure is followed in section 39b.

The alkylation contactor 41 is maintained at a temperature of about 35° F. and at a pressure of about 3.5 p. s. i. g. Since the acid catalyst and hydrocarbon streams normally enter the contactor above 35° F., it is necessary to provide a method of cooling the reactor to remove the sensible heat in these streams. In addition, the exothermic mixture of the alkylation reaction requires further cooling to remove the heat of reaction and thereby maintain the reaction sections at the required low temperature. In the specific illustration, the cooling is accomplished by autorefrigeration of the reactants and reaction products. In carrying out this operation, vapors are withdrawn from the contactor through conduit 65 into a dry drum 67. Any material settling in the dry drum is returned to the contactor operation zone beneath the acid level through conduit 71. The dry gas from drum 67 enters the suction of a compressor (not shown) through conduit 69, is compressed, condensed, passed to a separation system for the removal of propane and the condensate is returned to the contactor in the isobutane recycle through conduit 33.

A substantial amount of the vaporization which occurs in the contactor takes place in the entrance chamber 37 and the reaction sections 39, 39a and 39b. The isobutane recycle stream enters the contactor as a liquid and at a higher temperature and pressure than that maintained within the contactor. As a result, a portion of this stream flashes in the entrance chamber 37. To prevent a mixture of liquid and vapor from passing into the suction of pump 45, an outlet for this gaseous material is provided through conduit 59. A similar situation prevails in each of the reaction sections, since, in order to remove the reaction heat from each section, it is necessary that a further amount of light material be vaporized therein. This material is supplied partially by the alkylation feed from conduits 57, 57a and 57b, which feed is also introduced at a temperature and pressure higher than that maintained in the contactor. Vapor formed in the reaction section is removed from the contactor through conduits 59a and 59b, is combined with vapor from conduit 59, passes into the upper portion of the contactor downstream of the last reaction section and is withdrawn from the contactor through conduit 65. By this method of operation, heat of reaction, heat of mixing, etc., is removed and a relatively constant temperature is maintained throughout the contactor.

The effluent from the last reaction section comprising a mixture of propane, butane, unreacted isobutane, alkylate and acid passes through an emulsion breaking zone 43 formed by parallel transverse baffles and containing a conventional inert packing material. All of the effluent from the last section is forced to flow through this zone by a deflector baffle 49 extending above the liquid level within the contactor and downward within the emulsion breaking zone. Upon leaving this zone the acid separates from the hydrocarbon oil is contained in a settling zone enclosed by baffle 51 over which butane, alkylate and unreacted isobutane flow into the remainder of the contactor. The contaminated acid, containing polymers and other impurities passes from the contactor through conduit 53 and the alkylate product and unreacted hydrocarbons are removed from the contactor through conduit 55 for further processing (not shown).

For a more detailed illustration of the alkylation mixer, reference is had to Figure 2 which is a sectional view of the portion of the mixer 45 lying within the alkylation contactor. The mixer may be conveniently divided into an upper and lower portion. The lower part of the mixer comprises essentially a venturi-shaped propeller and bearing casing 19, a propeller 13 enclosed therein and a shaft 1 for rotating the propeller. The propeller 13 is located centrally in the throat of casing 19 and the propeller blades are so constructed that rotation of the propeller produces a high degree of turbulence and imparts a tangential and an upward thrust to liquid entering the mixer. The propeller is keyed on shaft 1 at the lower extremity thereof. Movement of the propeller in a downward direction is prevented by a propeller lock nut 15 screwed to the end of the drive shaft and enclosed by cover nut 17 shaped to present a minimum resistance to liquid flow. The lower portion 8 of drive shaft 1 is of a smaller diameter than the upper part 10. Upward movement of the propeller along shaft 1 is prevented by a shaft sleeve 9 which bears against collar 7 which is fitted to the lower portion 8 of the shaft and in turn bears against the upper larger portion of the shaft. Enclosing the shaft sleeve 9 is a bearing bushing 11 which is held in place by a bearing block or bearing housing 5 and the upper portion of which is hollow. The hollowed portion of the housing in turn openly communicates with a hollow shaft casing 3 which encloses drive shaft 1. The entire assembly is maintained centrally within casing 19 by web stator vanes 22 situated above the propeller 13 in the diffusing section of casing 19. Communication is provided between the interior of the bearing housing 5 and the diffuser section of casing 19 by passageways 21.

The lower portion of the mixer containing the component parts just described is held to the upper portion by means of a circular series of bolts 2 which fasten the flanged casing 19 to the supporting shell 29. The top of shell 29 is sealed by a plate 75 containing an opening in central portion thereof to allow passage of the pump shaft 1. Slightly below plate 75 are a number of vapor vents 73 evenly spaced around one half of the periphery of the supporting shell; also located in the upper portion of the shell is the olefin inlet line 57 which passes through the shell and attaches to the hollow shaft casing 3. The bottom of the supporting shell is closed by an annular tube sheet 26 which contains a circular series of tubes 28 extending in an upward direction within the shell and terminating below the vapor vents 73.

The mixture of acid and hydrocarbon, including propane, butane and isobutane entering the first reaction stage 39 is picked up by the propeller 13 and projected upward in a highly turbulent state and at a high velocity. The resulting emulsion enters the diffuser section of casing 19 where the tangential velocity components of the flowing emulsion are converted to longitudinal components, thereby providing a higher longitudinal velocity than existed in the region directly adjacent to the propeller 13. Simultaneous with the passage of the emulsion through casing 19 the alkylate feed containing butylene reactant enters the hollow shaft casing 3, passes in a downward direction into the hollow portion of the bearing housing 5, and then through passageways 21 into the diffuser section.

On introduction of the olefin containing feed into the acid-hydrocarbon emulsion the alkylation reactions proceed immediately and continue as the mixture of acid, isobutane and butylene moves upward. Leaving the diffuser section, the reaction mixture enters tubes 28 and passes upward into the supporting shell 29. The purpose of these tubes is to provide time for substantially complete reaction of the butylene before the reactants leave the mixer. The tubes 28 terminate a sufficient distance below the top of shell 29 to allow for reversal of flow and passage of the reactants and reaction products in a downward direction within the shell 29. The alkylation reaction is highly exothermic and quantities of heat are given off which cause a portion of the reactants to vaporize within the pump. As a result, a high degree of turbulence is produced in tubes 28 and a mixture of emulsion and vapor leaving these tubes jets upward within the pump case at a high velocity. While the major portion of the emulsion drops back within the pump and passes downwardly and out through openings 31, a portion of this material is carried with the vapor through vents 73.

The mixing pumps 45 are disposed within the contactor 41 as illustrated in Figure 1. The mixture of vapor and emulsion leaving vapor openings 73 enters the vapor space of each reaction stage in the upstream portion thereof, namely in the region opposite from the point of liquid overflow into the next stage. As a result, emulsion which separates from the vapors discharged from the mixing pumps tends to enter the liquid phase on the upstream side of the mixer and has a maximum time to separate into two phases before reaching the overflow point.

To provide maximum settling of emulsion from the vapors, the contactor vapor conduits 59a and 59b are also located at a distance from the region of vapor-emulsion discharge, in this instance approximately above the point of liquid overflow. This allows more complete emulsion separation from the vapors and serves to eliminate the entrainment problems, previously discussed.

The preceding illustration, although directed to a preferred embodiment of the invention is not intended in a limiting sense and other process flows and equipment well known to those skilled in the art are also within the scope of the invention.

The following data is presented to illustrate the various aspects of the invention in a commercial operation.

EXAMPLE

Data obtained from several operating plants indicated that the vapor lines leading from the alkylation contactor did not pass a sufficient quantity of vapor to prevent passage of vapor with the liquid stream going from one reaction zone to the next, even though these lines were sized properly for vapor flow. As a result, vapors entered the emulsion pumps, the hydraulic efficiency of the pumps was reduced and poor alkylating conditions resulted. In addition, acid consumption and migration of esters in the reactor effluent stream increased and the quality of the alkylate produced was reduced.

Tests were conducted on a commercial reactor at one of these plants to determine the cause of this difficulty. Pressure drop tests on the vapor lines from the reactor showed a 34" ($H_2O$) pressure drop where as the calculated pressure drop for the vapor flowing quantity was 21". Further examination indicated that liquid was settling out in the vapor line at points where direction changes occurred, such as at the control valve, T's and elbows, and was causing a restriction in cross-sectional area and increased pressure drop. In addition the circulation of acid through the alkylation system and acid consumption were substantially higher than normal operation would require. The above tests were made on a conventional reactor wherein vapor vents in the emulsion mixers were spaced around the periphery of said mixers.

In an effort to remedy this problem tests were conducted with emulsion mixer vents closed on the side facing toward the liquid overflow weir and the vapor line from each reaction zone. As a result, pressure drop across the vapor line was substantially reduced and the control valve was able to operate on control to hold the desired level and prevent any vapor from passing with the liquid flowing to the next emulsion mixer. Improved operation of the reactor occurred even at high production rates of 1000 B. P. D. of alkylate from each reaction zone. In addition, emulsion separation at the weir improved and acid consumption decreased from 2.0 #/gal. of alkylate produced to 1.0 #/gal.

Typical acid concentrations at different elevations in a reaction section, with and without vapor vent blanking, are shown in Table 1. Weir height to contain the liquid in the compartment is 7'4" above the bottom of the reaction section.

Table 1.—*Volume percent acid in sample*

| Feet Above Reactor Bottom | Conventional Mixer | | Mixer With Downstream Vapor Vents Blanked | |
|---|---|---|---|---|
| | Upstream of Mixer | Downstream of Mixer | Upstream of Mixer | Downstream of Mixer |
| 8.0 | 10 | 5 | 10 | 1.0 |
| 7.0 | 65–70 | 65–70 | 65–70 | 1.0 |
| 6.0 | 65–70 | 65–70 | 65–70 | 2.0 |
| 5.0 | 65–70 | 65–70 | 65–70 | 65–70 |
| 4.0 | 65–70 | 65–70 | 65–70 | 65–70 |
| 3.0 | 65–70 | 65–70 | 65–70 | 65–70 |
| 2.0 | 65–70 | 65–70 | 65–70 | 65–70 |
| 1.0 | 65–70 | 65–70 | 65–70 | 65–70 |

It is apparent from the data of Table 1 that blanking the downstream vents of the alkylation mixer has a substantial effect on emulsion separation in the upper part of the reactor and, therefore, on the amount of acid passing from each reaction stage.

Having thus described the invention by reference to a specific application thereof, it is understood that no undue limitations are to be imposed by reason thereof, but that the scope of the invention is defined by the appended claims.

I claim:

1. An apparatus suitable for conducting alkylation reactions which comprises a contactor, means for introducing an alkylation catalyst and an alkylatable compound into the lower portion thereof, means adjacent the top of said contactor for withdrawing liquid from the contactor, mixing means within the contactor and positioned to receive said alkylation catalyst and alkylatable compound introduced into the contactor, said mixing means adapted to emulsify said alkylation catalyst and alkylatable compound, means for introducing an alkylating compound into said mixing means to form a reaction mixture with said emulsion, means within said contactor enclosing said mixing means extending to the region of the top of said contactor, means for passing the reaction mixture upwardly within the enclosing means, vent means in the lower portion of said enclosing means for the withdrawal of liquid therefrom, vapor vent means in the upper portion of said enclosing means for release of vapors from the enclosing means, said vapor vent means located to release vapors into a region remote from said liquid withdrawing means adjacent the top of the contactor and vent means in the upper portion of the contactor for the passage of vapors therefrom.

2. An apparatus suitable for conducting alkylation reactions which comprises a contactor, means for introducing an alkylation catalyst and an alkylatable compound into the lower portion of said contactor, means for removing vapor from the region of the top of said contactor, means for withdrawing liquid from the contactor, mixing means in the region of the bottom of said contactor to receive and emulsify said alkylation catalyst and alkylatable compound, means for introducing an alkylating compound into said mixing means to form a reaction mixture with said emulsion, cylindrical means within said contactor enclosing said mixing means and extending to the top region of said contactor, means for passing the reaction mixture upwardly within said enclosing means, vent means in the lower portion of said enclosing means for withdrawal of liquid therefrom, vapor vent means in the upper portion of the enclosing means for release of vapors therefrom to the upper region of said contactor, said vapor vent means including a plurality of ports disposed in the periphery of said cylindrical means opposite from said means for removing vapor from the contactor.

3. An apparatus suitable for conducting alkylation reactions which comprises a contactor, means for venting vapors from the top region of said contactor, means for introducing an alkylation catalyst and an alkylatable compound into the bottom region of said contactor, means for withdrawing liquid from the contactor, mixing means within said contactor comprising an emulsifying section opening in said bottom region adapted to receive and emulsify the alkylation catalyst and alkylatable compound and a reaction section, means for introducing an alkylating compound into said emulsifying section to form a reaction mixture with the emulsion, a shell enclosing said mixing means and extending upwardly into the top region of said contactor, conduit means within said shell open at each end adapted to pass the reaction mixture upwardly to the upper portion of said shell, vapor vent ports in the upper portion of said shell above the terminus of said conduit means for flow of vapors to the top region of said contactor, said ports disposed in the half of the periphery of said shell remote from the point at which vapor is vented from said contactor.

4. An alkylation process which comprises introducing an alkylatable hydrocarbon and an alkylation catalyst into the lower portion of a contacting zone, emulsifying said hydrocarbon and catalyst, passing the emulsion upwardly at a high velocity through a confined reaction zone within said contacting zone, introducing an olefin hydrocarbon into the emulsion to initiate the alkylation reaction, passing emulsion from the reaction zone into the contacting zone, venting vapors from the reaction zone into a confined section of the upper region of the contacting zone, removing emulsion from the upper region of the contacting zone at a point remote from said confined section of said upper region of the contacting zone and venting vapors from the contacting zone.

5. The process of claim 4 in which vapors are vented from the contacting zone at a point remote from said confined section of said upper region of the contacting zone into which vapors are introduced from the reaction zone.

6. An alkylation process which comprises introducing an alkylatable hydrocarbon and an alkylation catalyst into the lower portion of a contacting zone, emulsifying said hydrocarbon and catalyst, introducing an olefin hydrocarbon into the emulsion to form a reaction mixture and to initiate the alkylation reaction, passing the reaction mixture upwardly at a high velocity through the confined reaction zone, reversing the direction of flow of the reaction mixture to return said reaction mixture into the lower portion of the contacting zone, venting vapors from the region of flow reversal in the reaction zone into a confined section of the upper region of the contacting zone, removing emulsion from the contacting zone, and removing vapors from the contacting zone at a point remote from said confined section of said upper region of the contacting zone into which vapors from the reaction zone are passed.

References Cited in the file of this patent

UNITED STATES PATENTS

| 1,982,002 | Hatch | Nov. 27, 1934 |
| 2,205,089 | Gard et al. | June 18, 1940 |
| 2,209,920 | Hoover | July 30, 1940 |
| 2,263,534 | Aldridge | Nov. 18, 1941 |
| 2,429,205 | Jenny et al. | Oct. 21, 1947 |
| 2,454,869 | Goldsby et al. | Nov. 30, 1948 |
| 2,502,490 | Sweet | Apr. 4, 1950 |
| 2,688,646 | Russell | Sept. 7, 1954 |
| 2,760,850 | Lambert et al. | Aug. 28, 1956 |